Figure 1:
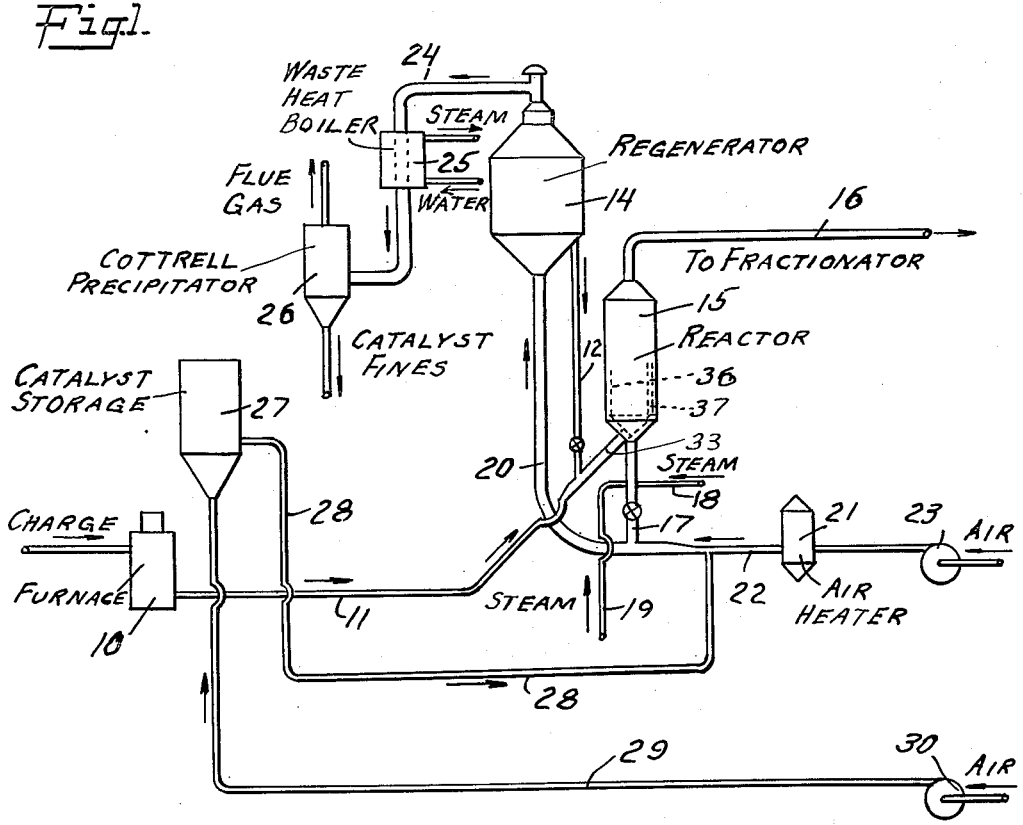

March 17, 1953 R. E. HOWE ET AL 2,631,928
CATALYTIC CRACKING APPARATUS
Filed May 14, 1947 2 SHEETS—SHEET 1

INVENTORS
ROBERT E. HOWE AND
WILLIS S. GULLETTE
BY
Fennie, Edmonds, Morton & Barrows
ATTORNEYS

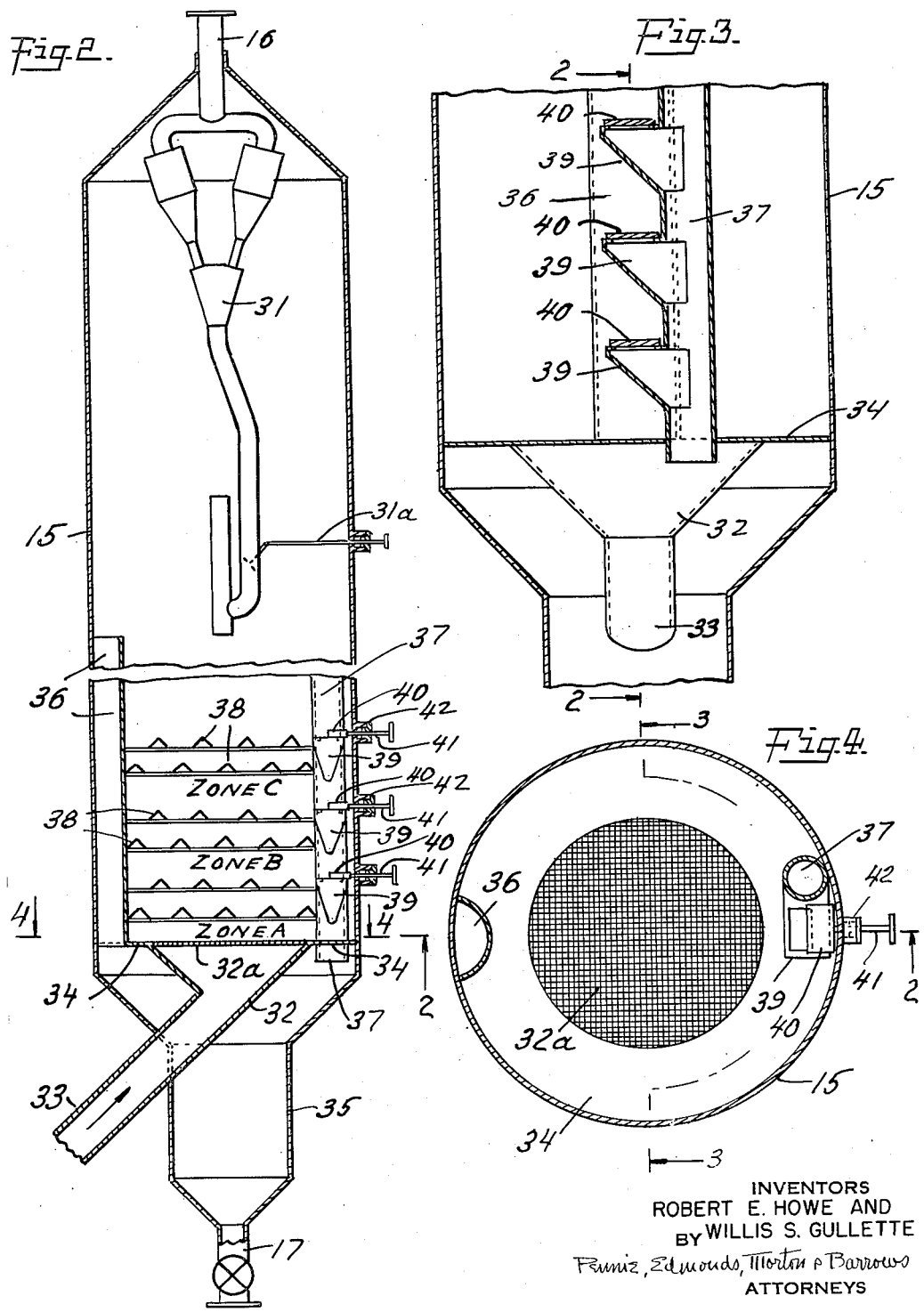

Patented Mar. 17, 1953

2,631,928

UNITED STATES PATENT OFFICE 2,631,928

CATALYTIC CRACKING APPARATUS

Robert E. Howe, Carbon County, Wyo., and Willis S. Gullette, Highland, Ind., assignors to Sinclair Refining Company, New York, N. Y., a corporation of Maine Application May 14, 1947, Serial No. 748,070

2 Claims. (Cl. 23—288)

1

Our invention deals with fluid catalytic cracking and more particularly to improvements in fluid catalytic cracking reactors.

In the systems to which our invention relates the catalyst, conventionally a natural silicate or a silica-alumina synthetic, is in finely powdered form and by aeration is maintained continuously in a free flowing condition. Circulation of the catalyst is achieved by utilization of the gas lift principle, that is by balancing a downflowing stream of high solids density against an up-flowing stream of low solids density.

Such systems comprise, in addition to the vessel in which the catalyzed cracking reaction takes place, a separate vessel for regeneration of the catalyst by the burning off of coke deposited thereon as an incident of the cracking reaction and various auxiliary equipment. Our invention, as indicated above, is specifically directed to the reactor but the effects are reflected in the improved operation of the system as an entity.

In the operation of the conventional reactor the oil to be cracked enters the reactor as a vapor with the powdered catalyst dispersed therein, through a pipe, usually diagonally disposed, terminating in a funnel shaped portion capped with a grid which serves primarily to prevent the entry of any chunks or fragments of agglomerated catalyst from the upper reaches of the reactor chamber but which may also perform a mixing or distributing function. Spent catalyst collects below the flared portion of the feed pipe and before being passed to the regenerator by a current of hot air is steamed to remove volatiles, the area of the steaming being referred to as the "stripping" zone.

Under the described arrangement, it is theoretically possible for fresh catalysts after being carried into the reactor to immediately drop into the stripping zone before it has had a chance to do its work and actual occurrence of this undesideratum is indicated by operating results.

Our invention which will be made clear from the accompanying drawings illustrating a preferred embodiment thereof besides largely obviating the possibility of loss of catalyst values from premature deposition of freshly charged catalyst in the stripping zone materially increases the efficiency of the steam stripping operation. Basically, the invention resides in the establishment of progressive cracking zones within the reactor and the maintenance of a low catalyst level in the stripping zone.

With regard to the drawings, Figure 1 is a simplified flow diagram illustrative of a fluid catalytic cracking system as a whole, this figure serving to set the environment of our invention; Figure 2 a broken sectional elevation of a reactor equipped according to the invention; Figure 3 a section on line 3—3 of Figure 4 and Figure 4 a section on line 4—4 of Figure 2.

Referring first to Figure 1, the oil to be cracked, normally gas oil, is introduced into a furnace 10 wherein it is heated to a predetermined temperature before being passed via line 11 in company with catalyst, charged to the oil stream from valve controlled standpipe 12 depending from regenerator 14, into reactor 15. Cracked products are conveyed from the reactor 15 to a fractionator, not shown, via line 16, while spent catalyst is withdrawn from the bottom of the reactor through valve controlled pipe 17 after being treated with steam admitted via lines 18 and 19, the steam serving to strip the catalyst of volatile hydrocarbons which with the steam leave the reactor in the company of the cracked products. The discharged spent catalyst is carried into the regenerator 14 via pipe 20 by hot air from air heater 21 connected with pipe 20 through line 22 and fed by compressor 23, the air being heated to a temperature sufficiently high to burn off the carbonaceous matter deposited on the catalyst during the cracking reaction. Flue gas from the regenator 14 is conveyed via pipe 24, passing through waste heat boiler 25, to a Cottrell precipitator 26 which serves to separate entrained catalyst. The separated catalyst may be returned to the regenerator, passed to catalyst storage or otherwise disposed of. Fresh catalyst is introduced into the system as required from hopper 27 via line 28 connecting with line 22 joining air heater 21 and the regenerator standpipe 20, the fresh catalyst being carried in a stream of air admitted to the hopper from line 29 extending from compressor 30.

In many operations, the furnace 10 is needed only for start-up, more than sufficient heat being recovered from the catalyst regeneration for the pre-vaporization of the oil charge. Heat liberated in the regenerator in excess of vaporizing and cracking requirements is readily removed by circulating a stream of catalyst, withdrawn from standpipe 12 associated with the regenerator 14, through a suitable boiler.

The operating temperature and other conditions, of course, vary depending upon the charge stock and the products desired. In the production of motor fuels of improved quality from gas oil charge stocks the temperature of the oil vapor and catalyst ranges from about 800°–975° F., while the temperature at which the carbon is burned off the catalyst in the regenerator is of the order of from 1000°–1150° F.

As is well understood in the art, the operation of fluid catalytic cracking systems can be rendered entirely automatic. The ratio of catalytic flow to oil flow may be controlled by a mechanism which is actuated by changes of the density of the catalyst-oil mixture, the flow of catalyst to the regenerator by the level of the spent catalyst above the valve in the reactor catalyst discharge pipe, i. e. pipe 17 in the drawings.

Referring now particularly to Figures 2–4, which omit parts unnecessary to an understanding of our invention, the reactor as improved according to the invention will be seen as comprising, in addition to the usual cyclone separator 31, controlled through a damper 31a, for removing catalyst from the cracked products and the usual funnel shaped element 32, integral with or attached to the catalyst-oil charge pipe 33, an annular plate or partition 34 extending radially from the rim of the funnel element to the walls of the reactor and separating the steam stripping section 35 of the reactor from the section in which the cracking takes place. Plate 34 is perforated to allow for the passage of a trough 36 and a pipe 37, the trough forming with the walls of the reactor a conduit serving to remove the products of the steam stripping operation, the pipe serving to transport spent catalyst from the cracking section to the stripping section. A plurality of series of baffles 38 above the mouth of the funnel element 32 provide for mixing of the catalyst and oil vapor additional to that obtaining as a consequence of introduction of the two materials together and delineate zones of reaction within the chamber of the reactor above the annular plate 34, the three zones shown in Figure 2 being legended A, B and C.

For control of catalyst depth in the cracking section there are provided extensions or truncated branches 39 of pipe 37, these preferably, but not necessarily, being disposed in substantial horizontal alignment with the baffles 38 as shown and each being capped with a gate 40 actuated through a rod 41 extending through a packing gland 42.

In the operation of the reactor the level of catalyst maintained therein is determined by other operating factors, a high level being indicated in some instances, a relatively low level in others. Through proper manipulation of the gate closures the catalyst is easily kept at substantially any desired level.

The interposition of the annular plate 34 does not, of course, materially increase the reaction time regardless of the catalyst depth maintained but the negligible premature loss of fresh catalyst to the stripping section and the more intimate contact between the oil vapors and catalyst brought about by the presence of the baffle elements 38 materially increases cracking efficiency. The inter-position of the plate also makes possible more effective steam stripping of the catalyst before it is discharged via pipe 17 in that as a result thereof the catalyst in the stripping section 35 is maintained at a lower level than heretofore and consequently under a lower pressure.

As will be readily seen, the arrangement as shown in Figures 2–4 is subject to considerable modification. Thus, the desirable effects obtaining by reason of the presence of the plate 34 may be achieved, for example, by simply increasing the diameter of the mouth of the funnel element 32 so that the rim of the funnel extends to the walls of the chamber. When this is done, openings in the funnel allowing for the accommodation of the trough 36 and the pipe 37 must, of course, be provided. The number of zones shown in Figure 2, i. e. zones A, B and C, may, of course, be increased or decreased and a plurality of spent catalyst return pipes in lieu of a single return pipe may be installed. Also, it should be noted that means other than truncated extensions 39 may be employed to provide communication between pipe 37 and the cracking section. Thus, openings may be cut in the pipe itself and these openings covered with a spring pressed closure actuatable from outside the reactor through a suitable lever or alternatively, plug or plate type valves such as are described in the copending application, Serial No. 748,052 of Robert E. Howe, one of the applicants herein, and Thomas B. Kimball, filed May 14, 1947, now Patent No. 2,529,503, may be adapted to the purposes of the present invention.

We claim:

1. In a vertically disposed cylindrical fluid catalyst cracking reactor of the type comprising an upper reaction chamber and a lower internal spent catalyst stripping section which has at its upper end a port for products discharge and at its lower end a port for spent catalyst discharge and which has a conduit for introduction of an oil vapor-catalyst mixture leading upwardly into the smaller end of a funnel-shaped element substantially coaxially positioned within the lower portion of the reactor and which has the upper reaction chamber above the funnel-shaped element divided into a series of spaces by a plurality of vertically spaced horizontally disposed perforated partitions, the combination which comprises a partition extending from the rim of the funnel-shaped element to the walls of the reactor and separating the upper reaction chamber from the lower stripping section, a pipe having an open lower end in communication with the stripping section extending from said partition and up through the spaces defined by the vertically spaced horizontally disposed perforated partitions, a truncated branch of the pipe extending into each of said spaces and communicating therewith through an opening in the upper lateral surface thereof, slide valve means actuatable from outside the reactor interposed in each of the truncated branches and arranged to control flow therethrough and a separate conduit disposed within the reactor providing communication between the lower stripping section and the upper reaches of the reactor.

2. In a vertically disposed cylindrical fluid catalyst cracking reactor of the type comprising an upper reaction chamber and a lower internal spent catalyst stripping section which has at its upper end a port for products discharge and at its lower end a port for spent catalyst discharge and which has a conduit for introduction of an oil vapor-catalyst mixture leading upwardly into the smaller end of a funnel-shaped element substantially coaxially positioned within the lower portion of the reactor and which has the upper reaction chamber above the funnel-shaped element divided into a series of spaces by a plurality of vertically spaced horizontally disposed perforated partitions, the combination which comprises a partition extending from the rim of the funnel-shaped element to the walls of the reactor and separating the upper reaction chamber from the lower stripping section, a catalyst return pipe having an open lower end in communication with the stripping section extending from said partition and up through the spaces defined by the vertically spaced horizontally disposed perforated partitions, conduits extending from said pipe to their respective spaces, each of said conduits having an inlet opening therein communicating with its respective space, valve means connected to each of said conduits for controlling catalyst flow through each of said inlet openings, and a separate vapor conduit disposed within the reactor providing communication between the lower stripping section and the upper reaches of the reactor.

ROBERT E. HOWE.
WILLIS S. GULLETTE.

REFERENCES CITED

The following references are of record in the file of this patent:

UNITED STATES PATENTS

| Number | Name | Date |
|---|---|---|
| 2,304,128 | Thomas | Dec. 8, 1942 |
| 2,458,866 | Martin | Jan. 11, 1949 |
| 2,496,356 | Peet | Feb. 7, 1950 |

FOREIGN PATENTS

| Number | Country | Date |
|---|---|---|
| 574,064 | Great Britain | Dec. 19, 1945 |
| 574,892 | Great Britain | Jan. 24, 1946 |